United States Patent
Sood et al.

(10) Patent No.: US 7,881,475 B2
(45) Date of Patent: Feb. 1, 2011

(54) SYSTEMS AND METHODS FOR NEGOTIATING SECURITY PARAMETERS FOR PROTECTING MANAGEMENT FRAMES IN WIRELESS NETWORKS

(75) Inventors: Kapil Sood, Beaverton, OR (US); Jesse R. Walker, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1531 days.

(21) Appl. No.: 11/131,931

(22) Filed: May 17, 2005

(65) Prior Publication Data

US 2006/0262932 A1 Nov. 23, 2006

(51) Int. Cl.
*H04K 1/00* (2006.01)
(52) U.S. Cl. .................................... 380/272
(58) Field of Classification Search ................ 380/272
See application file for complete search history.

(56) References Cited

U.S. PATENT DOCUMENTS

| 6,134,233 | A | 10/2000 | Kay |
| 6,504,834 | B1 | 1/2003 | Fifield |
| 6,735,455 | B2 | 5/2004 | Naito et al. |
| 2005/0207581 | A1* | 9/2005 | Qi et al. ................ 380/270 |

FOREIGN PATENT DOCUMENTS

| TW | 0526453 | 4/2003 |
| TW | 0567705 | 12/2003 |
| WO | WO-2006124347 A2 | 11/2006 |
| WO | WO-2006124347 A3 | 11/2006 |

OTHER PUBLICATIONS

Bernard Aboba, "IEEE 802.1X Pre-Authentication" [online], Jun. 17, 2002 [retrieved Feb. 24, 2009], pp. 1-50, Retrieved from the Internet URL: www.drizzle.com/~aboba/IEEE/11-02-TBDr0-I-Pre-Authentication.doc.*
"How 802: 11 Wireless Works", *Microsoft. TechNet*, (Mar. 28, 2003), 3-10.
"International Search Report for corresponding PCT Application No. PCT/US2006/017565", (Sep. 22, 2006), 2 pgs.
Aboba, B., "IEEE 802.1X Pre-Authentication", IEEE 802.11-02/389r0, (Jul. 11, 2002), 20 pgs.
"Taiwanese Application Serial No. 95115876, Office Action mailed Jan. 12, 2009", 8 pgs.

* cited by examiner

*Primary Examiner*—Benjamin E Lanier
*Assistant Examiner*—Cordelia Zecher
(74) *Attorney, Agent, or Firm*—Schwegman, Lundberg & Woessner, P.A.

(57) ABSTRACT

Systems and methods provide a mechanism for wireless stations and access points to negotiate security parameters for protecting management frames. The access point and station determine which management frames they are capable of and desire to protect. Data indicating protected frames are then exchanged between the station and access point to select which management frames are to be protected and a protection mechanism to be used for protecting the management frames.

27 Claims, 7 Drawing Sheets

| Element Id | ~502 |
|---|---|
| Length | ~504 |
| Version | ~506 |
| Group Cipher Suite Count | ~508 |
| Group Cipher Suite List | ~510 |
| Pairwise Cipher Suite Count | ~512 |
| Pairwise Cipher Suite List | ~514 |
| Management Protection Capabilities | ~516 |
| Management Frame Count | ~518 |
| Management Frames Sub-Types List | ~520 |

FIG. 5A

| Element Id | ~502 |
|---|---|
| Length | ~504 |
| Version | ~506 |
| Group Cipher Suite Count | ~508 |
| Group Cipher Suite List / Table | ~510 |
| Pairwise Cipher Suite Count | ~512 |
| Pairwise Cipher Suite List | ~514 |
| Management Protection Capabilities | ~516 |
| Management Protection Profile Count | ~530 |
| Management Protection Profile Selector List / Table | ~532 |

FIG. 5B though a good may typify variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

SYSTEMS AND METHODS FOR NEGOTIATING SECURITY PARAMETERS FOR PROTECTING MANAGEMENT FRAMES IN WIRELESS NETWORKS

TECHNICAL FIELD

Embodiments of the present invention pertain to wireless communications. Some embodiments of the present invention relate to negotiating security parameters that can be used to protect management frames communicated between wireless nodes.

BACKGROUND

The use of wireless networking continues to grow at a rapid pace. Wireless networks are attractive for a number of reasons. They are convenient, they allow flexibility and roaming, and can support dynamic environments. Furthermore, they are relatively easy to install when compared with their wired counterparts. In some cases, for example in older buildings, they may be cheaper to deploy. An entire network can be put together in a matter of hours rather than days with no need for wiring or rewiring. In many scenarios, wireless networks can have a lower cost of ownership than their wired counterparts despite the cheaper cost of wired LAN cards.

While current wireless networks have advantages, they also come with security issues. Because no physical connection is required, any party with a compatible wireless network interface can inspect wireless packets regardless of whether the packets are meant for their system or not. While standards for encrypting data frames transmitted over wireless networks have been implemented, the same is not true for management frames. As a result, wireless networks continue to be vulnerable to attacks that can either disrupt the wireless sessions of other users or downgrade the security status of other sessions. Additionally, the lack of protection for management frames leaves wireless network users open to "man in the middle" attacks in which an attacker is able to read, insert and modify messages between two parties without either party knowing that the wireless link between them has been compromised.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

In the Figures, the same reference number is used throughout to refer to an identical component which appears in multiple Figures. Signals and connections may be referred to by the same reference number or label, and the actual meaning will be clear from its use in the context of the description.

Figure 1A:
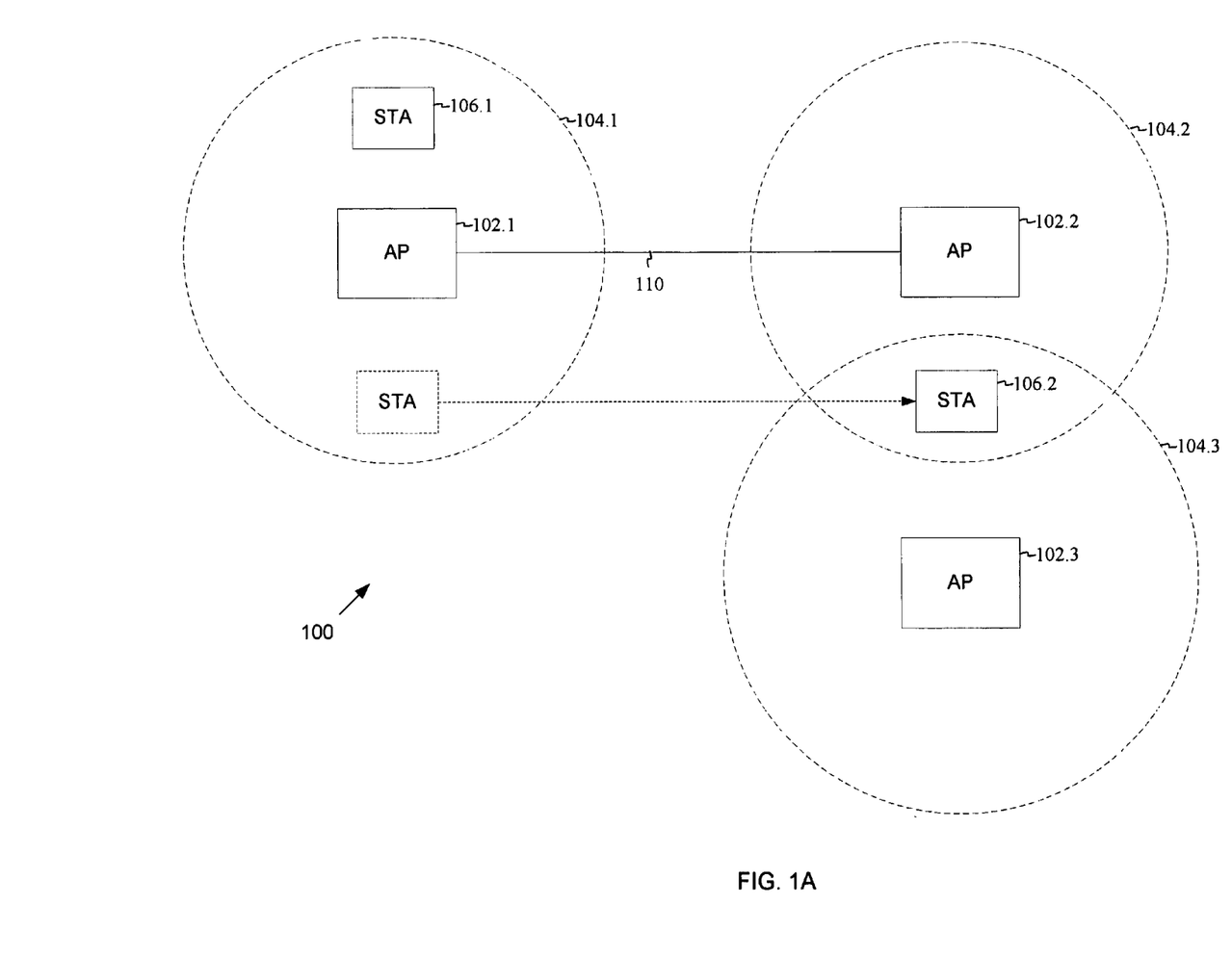
FIG. 1A illustrates an example wireless network in accordance with some embodiments of the present invention.

FIG. 1A illustrates components of in example wireless network 100 in accordance with some embodiments of the present invention. In some embodiments, network 100 may include one or more access points 102 and one or more stations 106. Access points 102 provide wireless stations 106 access to a wired or wireless network 110. Network 110 may be any type of network, examples include but are not limited to local area networks, wide area networks, or corporate intranets. Access point 102 may be a standalone access point, or it may be incorporated as part of another network device such as a bridge, router, or switch. In order to communicate reliably with an access point 102, a station 106 must be within a communication range 104 of access point 102.

Station 106 may be any type of device that can communicate wirelessly with other devices. Generally such devices may include personal computers, server computers, mainframe computers, laptop computers, portable handheld computers, set-top boxes, intelligent appliances, personal digital assistants (PDAs), wireless telephones, web tablets, wireless headsets, pagers, instant messaging devices, digital cameras, digital audio receivers, televisions or other devices that may receive and/or transmit information wirelessly and hybrids of the aforementioned devices.

In some embodiments, stations and access points communicate with one another using protocols and standards established by the Institute of Electrical and Electronics Engineers (IEEE) for wireless communications. For example, some embodiments conform to the IEEE 802.11 standard, IEEE std. 802.11-1999, published 1999 and later versions (hereinafter "IEEE 802.11 standard) for the wireless LAN (WLAN). However, the systems and the methods described herein may be applied to other types of wireless networks. Examples of such networks include IEEE 802.16 Wireless Wide Area Networks (WWANs), and wired networks like IEEE 802.3 Ethernet Local Area Networks (LANs).

In some embodiments, Access Points may be considered a special type of a station, as defined by the IEEE for wireless communications. Some embodiments conform to the IEEE 802.11 standard. However, the systems and methods described herein may be applied to communication between all types of IEEE 802.11 stations, including, two stations, one station and one access point, or two access points.

As station 106 comes within the range 104 of an access point 102, the station and access point will typically begin a series of messages that are designed to initiate a communications session between the station 106 and the access point. In some embodiments, station 106 is a portable or mobile device that may leave the range of one access point and enter the range of one or more other access points, i.e. a station 106 may roam from one access point to another. In the example shown in FIG. 1A, station 106.2 has left the range 104.1 of access point 102.1, and has come within ranges 104.2 and 104.3 of access points 102.2 and 102.3 respectively. In this case, station 106.2 will typically select one of the access points 102.2 or 102.3 in order to continue to have access to systems through network 110. Further details on methods and messages used in various embodiments to securely establish communications with an access point and to roam to another access point are provided below.

Figure 1B:
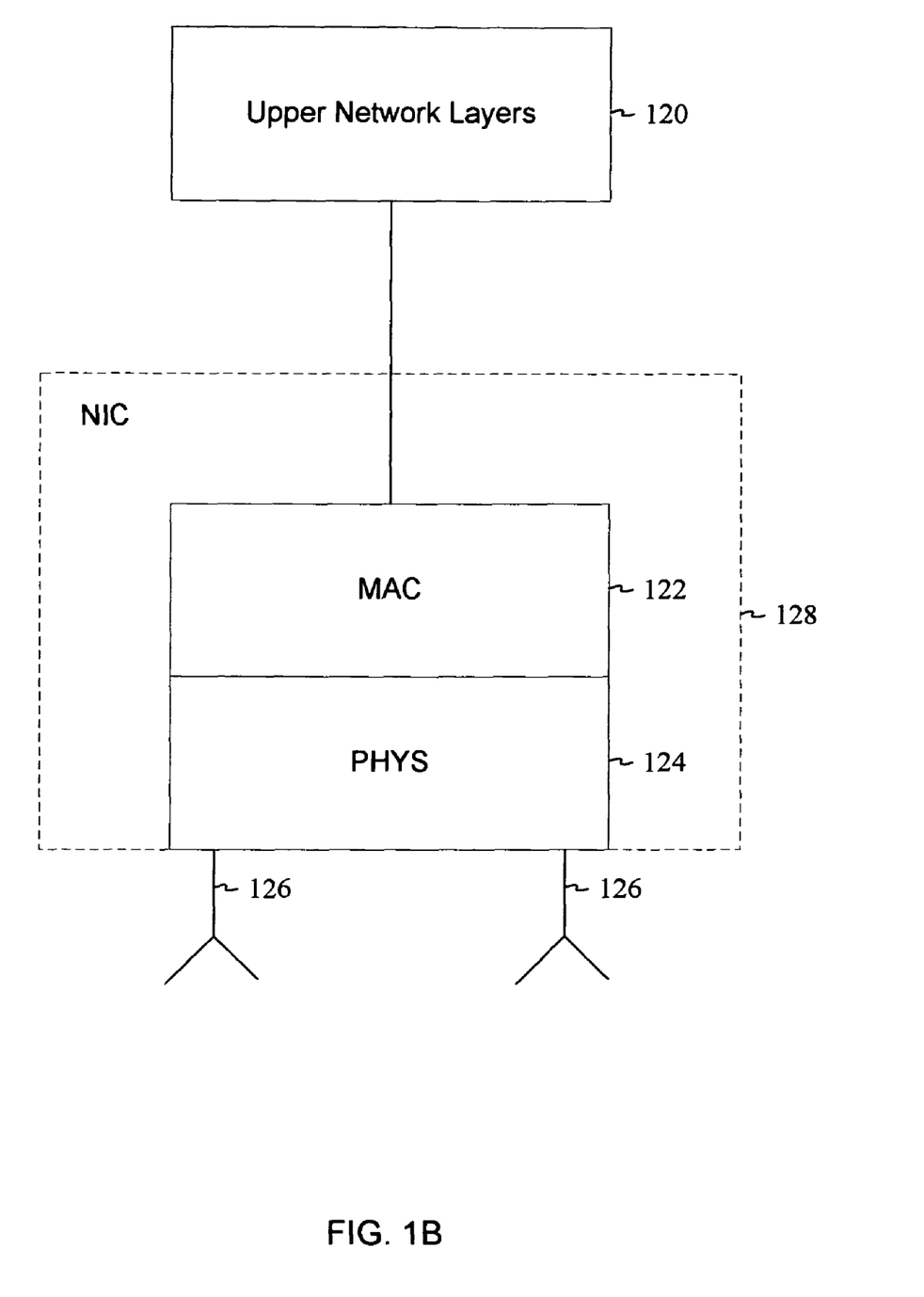
FIG. 1B illustrates further details on network devices according to some embodiments of the present invention.

FIG. 1B illustrates further details on components included in network devices according to some embodiments of the present invention. The components illustrated in FIG. 1B may be incorporated in network devices such as wireless access points, wireless stations, and wireless network interface cards. In some embodiments, the components include upper network layers 120, media access and control (MAC) 122, physical layer (PHY) 124, and one or more antennas 126.

In some embodiments, upper network layers comprise one or more protocol layers that operate above the MAC 122 layer. In some embodiments, the layer may include one or more of application, presentation, session, transport or network layers. In addition, the layers may include protocols such as the TCP/IP protocol (Transmission Control Protocol/Internet Protocol)

MAC 122 operates between the upper network layers 120 and the physical layer 124. Network data received from upper network layers 120 is processed and sent to other network nodes via physical layer 124. Network data received from physical layer 124 is processed and sent to the upper network layers 120 for processing.

In some embodiments, physical layer 124 may transmit and/or receive RF communications in accordance with specific communication standards, such as the IEE standards including IEEE 802.11(a), 802.11(b), 802.11(g/h) and/or 802.11(n) standards for wireless local area networks (WLANs) and/or the IEEE 802.11(s) and IEEE 802.11(e) standards for wireless mesh networks, although physical layer 124 may also be suitable to transmit and/or receive communications in accordance with other techniques.

Antennas 126 may comprise one or more directional or omnidirectional antennas, including, for example, dipole antennas, monopole antennas, patch antennas, loop antennas, microstrip antennas or other types of antennas suitable for reception and/or transmission of RF signals by physical layer 124.

In some embodiments MAC 122, physical layer 124 and antennas 126 are incorporated on a network interface card (NIC) 128. NIC 128 may be a component of a computer system and provides wireless network capability to the computer system.

The description below makes reference to management frames. For the purposes of this specification, a management frame includes any frame not related to communicating data frames. Management frames thus include connection establishment related frames and connection maintenance frames. Examples of management frames include the management frames defined in the IEEE 802.11 standard and may also include action frames as defined in the IEEE 802.11(e), 802.11(h), 802.11(k) and 802.11(v) amendments to the IEEE 802.11 standard. Further, those of skill in the art will appreciate that management frames may include later developed management and action frames.

Figure 2:
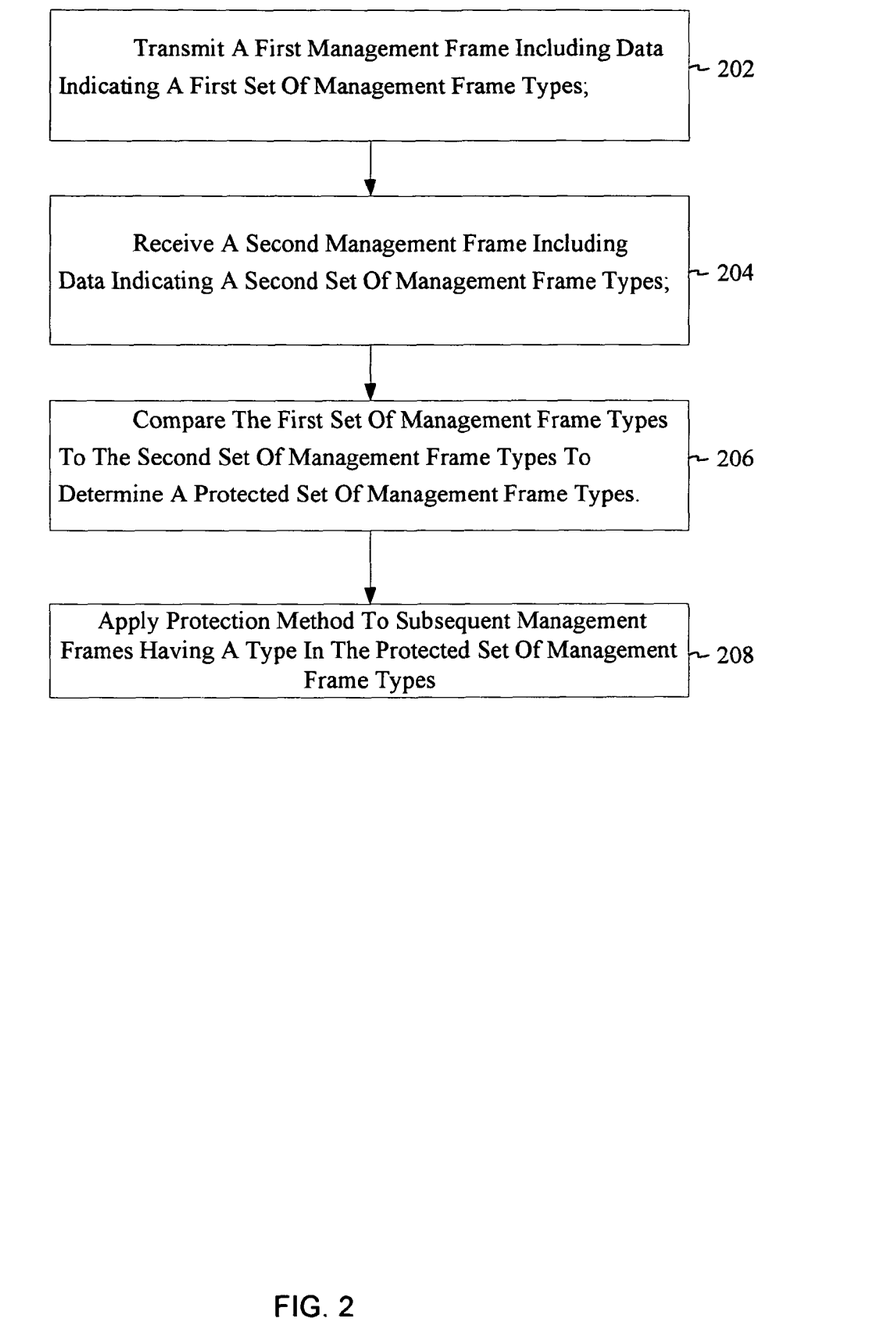
FIG. 2 is a is a flow chart of a management frame protection negotiation procedure in accordance with some embodiments of the present invention.

FIG. 2 is a flow chart of a management frame protection negotiation method in accordance with some embodiments of the present invention. The method begins by transmitting a first management frame that includes data indicating a set of management frame types the transmitter is willing to protect (block 202). Typically, the first management frame will comprise a beacon management frame or a probe response management frame issued by an access point. Thus an access point may advertise the availability of management frame protection in a beacon frame or probe response frame. However, no embodiment of the invention is limited to a particular type of first management frame. In alternative embodiments, the first management frame may be an association frame, an association response frame, a re-association frame, a re-association response frame, or a security handshake message such as an EAPOL (Extensible Authentication Protocol Over LANs) message frame. In some embodiments, the data indicating the set of management frame types is included in a management protection information element that is described in further detail below.

Next, a second management frame is received that includes data indicating a second set of management frames that the originator of the message desires to protect (block 204). In some embodiments, the second management frame may be an association request frame. In alternative embodiments, the second management frame may be an association response frame, a re-association frame, a re-association response frame, or a security handshake message such as an EAPOL message frame. In some embodiments, the data indicating the set of management frame types is included in a management protection information element that is described in further detail below.

Next, a comparison is made between the management frames in the first and second management frames to determine those frames that a protected set of management frames common to both communicating systems (block 206). Subsequent instances of management frames within the protected set of management frames are protected using a mutually acceptable security mechanism (block 208). In some embodiments, the security mechanisms that may be used are included in the first and second management frame. A security mechanism that is common to both first and second management frames may be selected for use in protecting subsequent management frames.

In some embodiments, the management frames that may be protectable include Disassociation Frames, Deauthentication Frames, or any Class 3 Action Frame, including QoS (Quality of Service) Action Frames, Radio Measurement Action Frames, Radio Spectrum Measurement Action Frames, and Wireless Network Management Action Frames. However other types of management frames are protectable and no embodiment is limited to a particular set of protectable management frames.

Figure 3A:
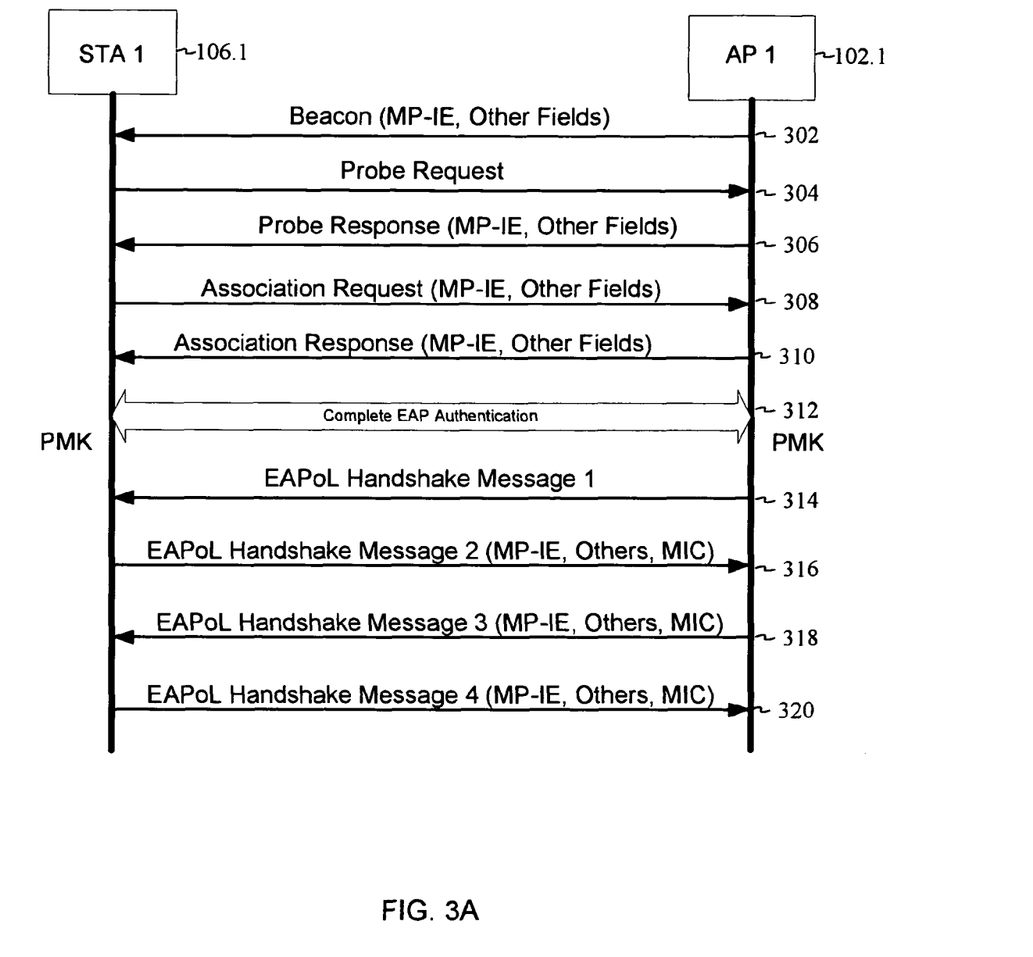
FIGS. 3A and 3B illustrate message sequences for management frame protection negotiation procedures in accordance with some embodiments of the invention.

FIG. 3A illustrates a message sequence for management frame protection negotiation procedures in accordance with some embodiments of the invention. The message sequence starts with the broadcast of a beacon frame by an access point (message 302). An access point periodically sends a beacon frame to announce its presence and relay information. In some embodiments, the beacon frame includes data indicating which management frame the access point is willing to protect. For example, the beacon frame may be formatted as described below in FIG. 3A or 3B to include a management protection information element (MP-IE) as described in FIG. 5A or 5B.

A station then sends a probe request to an access point it may wish to communicate with (message 304). A station sends a probe request frame when it needs to obtain information from another station. For example, a station would send a probe request to determine which access points are within range.

The access point then sends a probe response (message 306). A probe response typically provides capability information, supported data rates, etc. In some embodiments, the probe response will include an MP-IE.

The station then send an association request (message 308). An association request enables the access point to allocate resources for and synchronize with a station. In some embodiments, the association request may contain an MP-IE indicate which management frames the station desires to protect.

The access point then send an association response (message 310). The association response contains an acceptance or rejection notice to the station requesting association. In some embodiments, the association response may include an MP-IE indicating the management frames the access point will protect. If the access point accepts the station, the response includes information regarding the association, such as association ID and supported data rates. If the outcome of the association is positive, the station can utilize the access point to communicate with other devices and systems on the network 110 side of the access point.

The access point and station then complete EAP authentication (312) and a shared secret referred to as a PMK (Primary Master Key) is established. The station and access point then begin an EAPOL Handshake comprising messages 314-320. The handshake messages may contain the same MP-IEs that were in the previous management messages sent by the STA and the AP, respectively, which determine the management frames the access point and station agree to protect. In some embodiments, the handshake messages may be formatted as described below in FIG. 4A or 4B to contain MP-IEs as described in FIG. 5A or 5B. During the handshake process, the access point and station derive an integrity secret key for protecting and securing management frame protection negotiation.

In this message scenario, MP-IEs in the handshake messages 314, 316, 318, and 320 may be integrity protected as a result of the negotiation sequence with a previous access point by deriving an integrity secret key known only to the station and new access point. The handshake messages use this integrity secret key for securing contents of the handshake messages, including the MP-IE, by performing a message integrity check. This mechanism is desirable as it may prevent malicious adversaries from launching security downgrade, replay, man-in-the-middle, and forgery attacks against the wireless network. Security downgrade attacks force the stations and access points to negotiate weaker security parameters and keys, than they normally would. The mechanism in some embodiments allows the stations and access points to negotiate and enforce the strongest security parameters, algorithms, and keys, that are supported by the stations and access points.

Figure 3B:
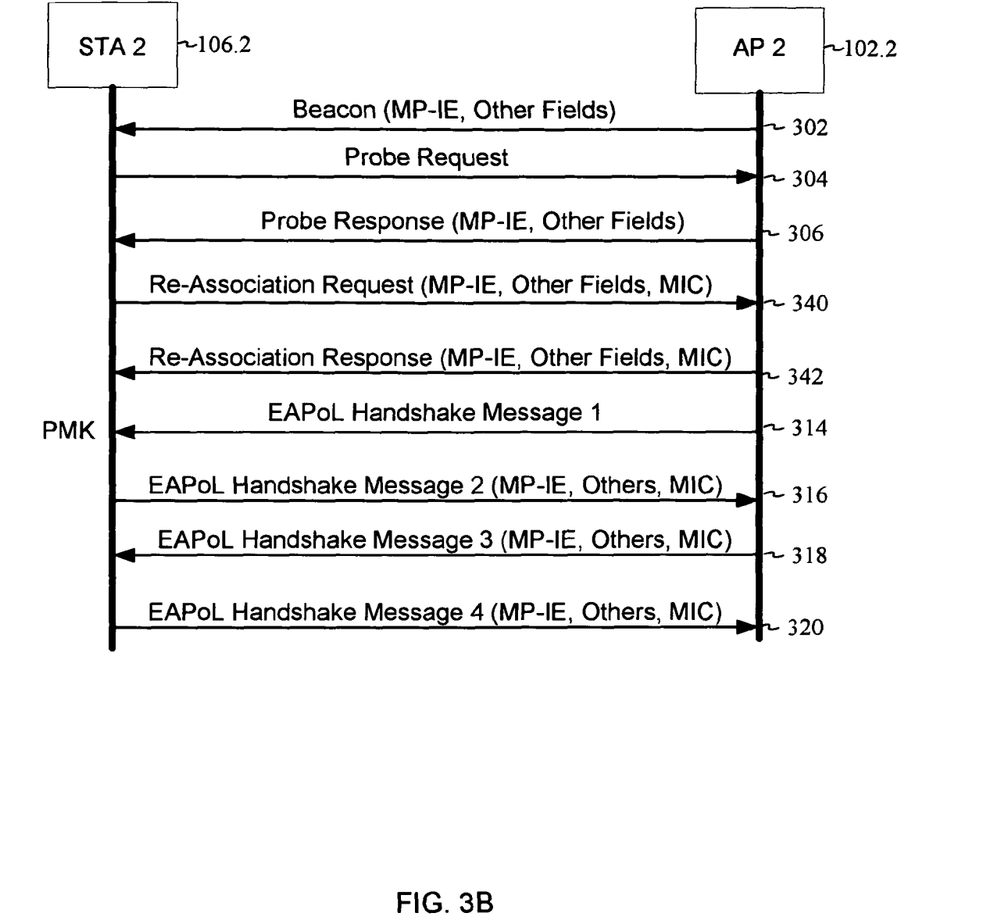

FIG. 3B illustrates a message sequence for management frame protection negotiation procedures in accordance with alternative embodiments of the invention. The message sequence illustrated in FIG. 3B may be used in a Fast Roaming or Transition scenario, when a station moves between access points. The message sequence begins as described above in FIG. 3A, that is, the access point and station exchange beacon, probe request, and probe response messages 302-306.

The station then send a re-association request message 340 to the new access point. The re-association request may contain an MP-IE indicating which management fields the station desires to protect. The new access point then coordinates the forwarding of data frames that may still be in the buffer of the previous access point waiting for transmission to the station.

The access point then sends a re-association response message 342. The re-association response message may contain an MP-IE indicating which management frames the access point may protect. Similar to the association process, the frame includes information regarding the association, such as association ID and supported data rates and an MP-IE.

In this message scenario, MP-IEs in the re-association request and response messages 340 and 342 may be integrity protected as a result of the negotiation sequence with a previous access point by deriving an integrity secret key known only to the station and new access point. The contents of the re-association request and re-association response messages may be secured against adversaries by applying a message integrity check using the integrity secret key. This mechanism used in some embodiments may prevent malicious adversaries from launching security downgrade, replay, man-in-the-middle, and forgery attacks against the wireless network. Security downgrade attacks force the stations and access points to negotiate weaker security parameters and keys, than they normally would. The mechanism in this embodiment allows the stations and access points to negotiate and enforce strongest security parameters, algorithms, and keys, that are supported by the stations and access points.

The station and access point then begin the 4-way EAPOL handshake negotiation in messages 314-320 as described above.

Figure 4A:
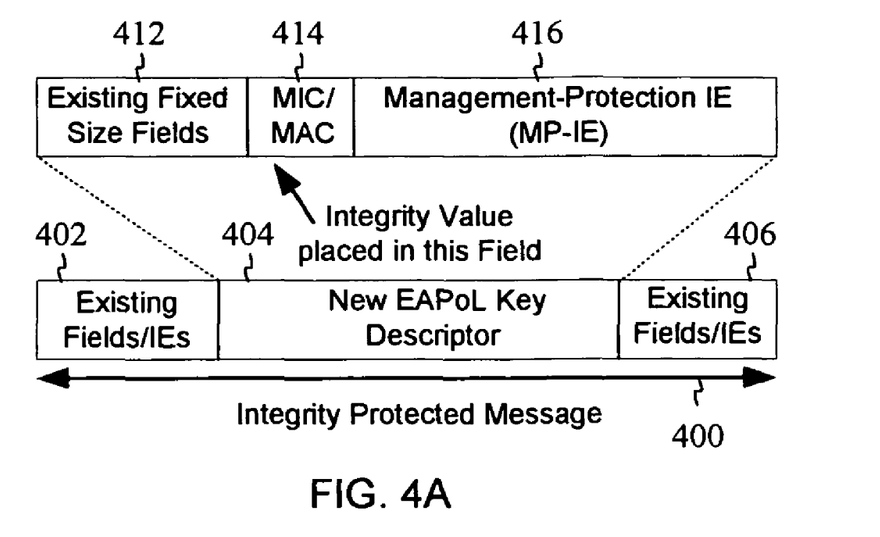
FIGS. 4A and 4B are block diagrams of management frames in accordance with some embodiments of the invention.

FIG. 4A is a block diagram describing the major components of a management frame 400 in accordance with some embodiments of the invention. In some embodiments, a management frame 400 includes leading existing fields 402, modified EAPOL key descriptor 404, and trailing existing fields 406. Leading existing fields 402 and trailing existing fields 406 comprise fields and information elements of management and action frames as currently defined in the IEEE 802.11 standard.

Modified EAPOL key descriptor 404 includes existing EAPOL fields 412, MIC field 414, and management protection information element 416. Existing EAPOL fields 412 comprise fields as currently defined in the IEEE 802.11 standard. MIC (Message Integrity Code, also referred to as a Message Authentication Code) fields 414 comprises a code value generated as specified in the IEEE 802.11 standard and is used by stations and access points to verify the integrity of messages. Existence of a MIC indicates that the message is integrity protected by a secret key known only to the station and access point. Management protection information element (MP-IE) 416 comprises a data structure that may be used to specify the management frame types that may be protected and the type of protection used. Further details on MP-IE 416 are provided below with reference to FIGS. 5A and 5B.

Figure 4B:
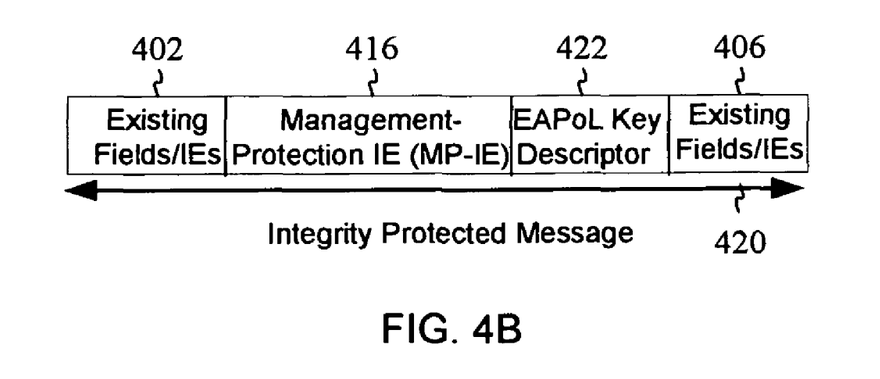

FIG. 4B is a block diagram describing the major components of a management frame in accordance with alternative embodiments of the invention. In some embodiments, management frame 420 includes leading existing fields 402, MP-IE 416, and EAPOL key descriptor 422. As noted above, leading existing fields 402 and trailing existing fields 406 comprise fields and information elements of management and action frames as currently defined in the IEEE 802.11 standard. Additionally, EAPOL key descriptor 422 comprises an EAPOL descriptor as currently defined by the IEEE 802.11 standard. MP-IE 416 comprises a data structure that may be used to specify the management frame types that may be protected and the type of protection used. Further details on MP-IE 416 are provided below with reference to FIGS. 5A and 5B.

As can be seen from the above, MP-IE 416 may be embedded in an existing field of a management frame, for example an EAPOL field, or it may be added as an additional field to a frame.

Figure 5A:
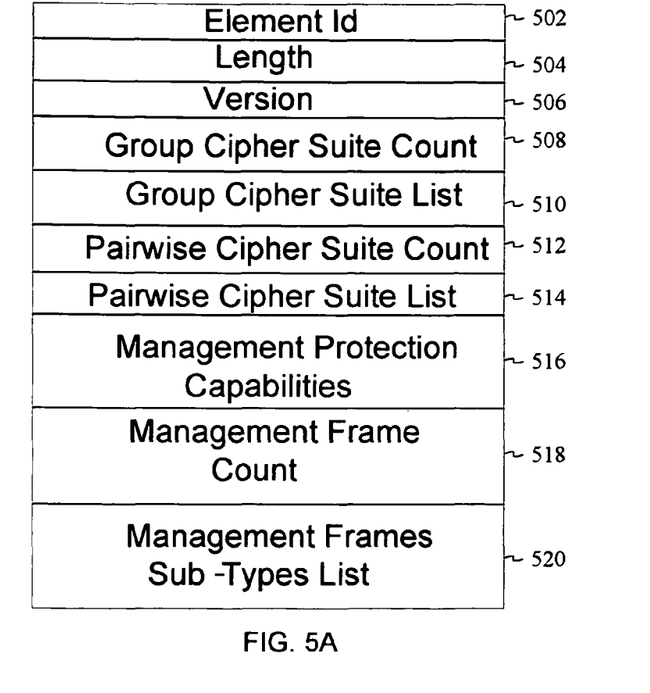
FIGS. 5A and 5B are block diagrams of management protection information elements in accordance with some embodiments of the invention.

FIG. 5A is a block diagram of a management protection information element 416 in accordance with embodiments of the invention. In some embodiments, MP-IE 416 includes element ID 502, length field 504, version field 506, group cipher suite count 508, group cipher suite list 510, pairwise cipher suite count 512, pairwise cipher suit list 514, management protection capabilities field 516, management frame count 518 and management frames sub-type list 520. Element ID 502 is a value assigned to indicate that the data structure is an MP-IE. Length field 504 specifies the size of the MP-IE data structure. Version field 506 specifies a version for the MP-IE data structure and indicates the currently supported version of the protocol that is implementing the protection for management frames.

Group cipher suite count 508 provides the number the number of group cipher suites in group cipher suite list 510. Group cipher list 510 comprises a list of one or more cipher suites for providing protection for broadcast and multicast management frames, between the station and access point. The station and access point may use the list to negotiate one of the cipher suites that both station and access point support. In some embodiments, the selected cipher suite will use a distinct integrity and/or confidentiality key, which is derived to provide integrity and/or confidentiality protection for broadcast/multicast frames.

Pairwise cipher suite count 512 provides a count of the number of cipher suites in pairwise cipher suite list 514. Pairwise cipher suit list 514 comprises a list of one or more cipher suites for performing integrity and/or confidentiality protection calculations for all unicast management frames between a station and access point. In some embodiments, a station and access point may negotiate one of the cipher suites that both support. The negotiated pairwise cipher suite may use a distinct integrity and/or confidentiality key, which is derived to provide integrity and/or confidentiality protection for unicast frames.

The group cipher suites and pairwise cipher suits may comprise any type of cryptographic algorithm. In some embodiments, combinations of one or more of the following cryptographic algorithms may be used as cipher suites: AES (Advanced Encryption Standard), including AES-OMAC (One-key cipher block chaining Message Authentication Code), RMAC (Keyed-Hash Message Authentication Code) or Hash using algorithms SHA-256, SHA-512, TKIP (Temporal Key Integrity Protocol), and/or CCMP (counter mode with cipher-block chaining with message authentication code). Other cryptographic methods now known or later developed may also be included in the group or pairwise cipher suites.

Management protection capabilities field 516 field indicates security parameters that may be negotiated between a station and access point. In some embodiments, the data structure comprises a bit mask, with individual bits or groups of bits indicating which parameters may be negotiated. In some embodiments, the negotiated parameters include whether or not protection of management frames is enabled, support for IEEE 802.11i key hierarchy, and support for IEEE 802.11r key hierarchy. Other parameters may be included in the data structure as needed or later developed.

Management frame count 518 provides count of the number of sub-types in management frames sub-type list 520. Management frames sub-type list 520 lists the subtypes of the management frames that can be negotiated between a station and access point. This allows the network administrator to implement security policies, for specific wireless networks. In some embodiments, an access point lists all the management frames subtypes, in its MP-IE 416, that are supported for protection in the network. A station that supports management frame protection responds with its own MP-IE, including a list of management frame subtypes. The station uses the fields described above to select a list of management frames sub-types that the station can support for protection, one if the advertised Group Key Cipher Suites and one of the advertised Pairwise key cipher suites.

Figure 5B:
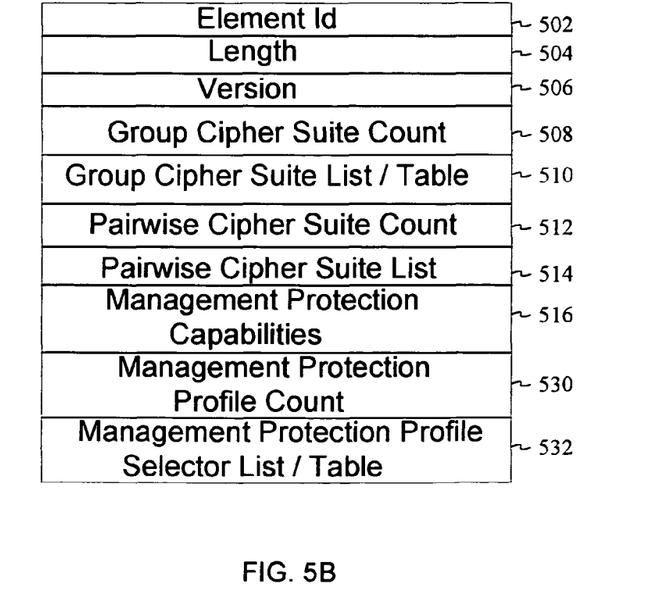

FIG. 5B is a block diagram of a management protection information element 416 in accordance with alternative embodiments of the invention. In some alternative embodiments, MP-IE 416 includes element ID 502, length field 504, version field 506, group cipher suite count 508, group cipher suite list 510, pairwise cipher suite count 512, pairwise cipher suit list 514, management protection capabilities field 516, management protection profile count 530 and management protection profile selector list 532. Fields 502-516 are generally the same as described above with respect to FIG. 5A.

Management protection profile count 530 provides the number of profiles in management protection profile list 532. Management protection profile list 532 comprises a list of management protection profile selectors identifying management protection profiles. A management protection profile selector may be an Organization Unit Identifier (OUI) followed by the type or value, or a list of values. In the case of IEEE specified OUIs, the OUI may be the same as those specified in IEEE 802.11i.

The management protection profile value(s), contained in the MP-IE 416 indicates a grouping of the management frame subtypes that are supported by the station or access point. Each Management Protection Profile value or number may be associated with a set of management frames that can be protected.

As described above, in some embodiments the management protection profiles, management frame types, group cipher suites, and pairwise cipher suites may be specified as lists. This is desirable because the set of management frames and cipher suites to be protected may be expanded to include future types of frames and cipher suites. Further, the lists may be configured for varying environments.

The set of management frames protected by a particular management protection profile number may be specified in number of ways, including as an amendment to the IEEE 802.11 standard, or the profile may be vendor specified, with each vendor having different values. When a management protection profile number is specified by an 802.11 amendment, the profile number may include all the management frames protected by a prior management protection profile numbers specified by the IEEE.

Additionally, vendors can create their own OUIs for advertising vendor specific subsets of management frames that they support.

Additionally, network operators and enterprise can create their own OUIs for advertising the specific subset of management frames that are enabled and supported on their wireless networks.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method for execution by one or more processors, the method comprising:
   transmitting a first management frame including data indicating a first set of management frame types, wherein the first management frame further includes data specifying at least one protection method;
   receiving a second management frame including data indicating a second set of management frame types; and
   comparing by the one or more processors the first set of management frame types to the second set of management frame types to determine a protected set of management frame types.

2. The method of claim 1, wherein the first management frame comprises a beacon frame.

3. The method of claim 1, wherein the first management frame comprises a probe response frame.

4. The method of claim 1, wherein the second management frame comprises an association frame.

5. The method of claim 1, wherein the second management frame comprises a reassociation frame.

6. The method of claim 1, wherein the set of management frame types includes management frame types selected from the group comprising: Disassociation Frame, Deauthentication Frame, Class 3 Action Frame, QoS Action Frame, Radio Measurement Action Frame, Radio Spectrum Measurement Action Frame, and Wireless Network Management Action Frame.

7. The method of claim 1, further comprising applying the at least one protection method to subsequent management frames having a type in the protected set of management frame types.

8. The method of claim 1, further comprising:
   receiving a third management frame in a protected negotiation, the third management frame including data indicating a third set of management frame types; and
   comparing the third set of management frame types to the first set of management frame types.

9. The method of claim 1, further comprising configuring the first set of management frame types.

10. A non-transitory machine-readable medium encoding a data structure, the data structure comprising:
    a first field indicating a set of one or more management frame types; and
    a second field indicating a set of one or more protection mechanisms where in a separate data processing step, one of the set of one or more protection mechanisms is applied to the set of one or more management frame types.

11. The non-transitory machine-readable medium of claim 10 wherein the set of one or more management frame types are specified by an organizational identifier.

12. The non-transitory machine-readable medium of claim 10, wherein the set of one or more management frame types is provided in a list of frame types.

13. The non-transitory machine-readable medium of claim 10, wherein the data structure is included in a management frame.

14. The non-transitory machine-readable medium of claim 13, wherein the management frame comprises a protected negotiation frame.

15. The non-transitory machine-readable medium of claim 13, wherein the management frame comprises an integrity protected management frame.

16. The non-transitory machine-readable medium of claim 13, wherein the data structure is included in an EAPOL field of the management frame.

17. The non-transitory machine-readable medium of claim 10, wherein the set of one or more protection mechanisms specify protection mechanisms to be applied to unicast management frames and wherein the data structure further includes a third field specifying a list of one or more protection mechanisms to be applied to broadcast management frames.

18. A network device comprising:
    a physical layer; and
    a media access control coupled to the physical layer and operable to:
       receive a first management frame including data indicating a set of management frame types protectable by a second network device, wherein the first management frame further includes data specifying at least one protection method;
       determine a protected set of management frame types by comparing the set of management frame types protectable by the second network device to a set of management frame types protectable by the network device; and
       transmit a second management frame including data indicating the protected set of management frame types.

19. The network device of claim 18, wherein the physical layer and media access control are incorporated in an access point.

20. The network device of claim 18, wherein the physical layer and media access control are incorporated in a network interface card.

21. The network device of claim 18, wherein the physical layer and media access control are incorporated in a wireless station.

22. A system comprising:
a substantially omnidirectional antenna;
a physical layer coupled to the omnidirectional antenna; and
a media access control coupled to the physical layer and operable to:
  transmit a first management frame including data indicating a set of management frame types protectable by a wireless access point, wherein the first management frame comprises a EAPOL handshake frame;
  receive a second management frame including data indicating a set of management frame types protectable by a station; and
  compare the first set of management frame types to the second set of management frame types to determine a protected set of management frame types.

23. The system of claim 22, wherein the second management frame comprises an EAPOL handshake frame.

24. A non-transitory machine-readable medium having stored thereon machine executable instructions stored thereon for performing a method, the method comprising:
  transmitting a first management frame including data indicating a first set of management frame types, wherein the first management frame comprises a EAPOL frame;
  receiving a second management frame including data indicating a second set of management frame types; and
  comparing the first set of management frame types to the second set of management frame types to determine a protected set of management frame types.

25. The non-transitory machine-readable medium of claim 24, wherein the first management frame comprises a probe response frame.

26. The non-transitory machine-readable medium of claim 24, wherein the second management frame comprises a reassociation frame.

27. The non-transitory machine-readable medium of claim 24, wherein the second management frame comprises a message integrity protected frame.

* * * * *